United States Patent [19]
Morikawa et al.

[11] Patent Number: 6,159,526
[45] Date of Patent: Dec. 12, 2000

[54] METHOD FOR MANUFACTURING WATER-CONTAINING CHOCOLATES AND CHOCOLATE COMPOSITIONS PRODUCED THEREBY

[75] Inventors: Kazutoshi Morikawa; Akira Kurooka, both of Izumisano, Japan

[73] Assignee: Fuji Oil Co., Ltd., Izumisano, Japan

[21] Appl. No.: 09/427,067

[22] Filed: Oct. 26, 1999

Related U.S. Application Data

[63] Continuation of application No. PCT/JP99/00804, Feb. 22, 1999.

[30] Foreign Application Priority Data

Mar. 2, 1998 [JP] Japan ................... 10-049254

[51] Int. Cl.⁷ ..................................... A23G 1/00
[52] U.S. Cl. ........................... 426/611; 426/631
[58] Field of Search ..................... 426/631, 611

[56] References Cited

U.S. PATENT DOCUMENTS

| | | | |
|---|---|---|---|
| 4,446,166 | 5/1984 | Giddey | 426/631 |
| 4,847,105 | 7/1989 | Yokobori | 426/611 |
| 5,120,566 | 6/1992 | Baba | 426/631 |
| 5,149,560 | 9/1992 | Kealey | 426/631 |
| 5,387,429 | 2/1995 | Cooper | 426/611 |
| 5,419,925 | 5/1995 | Seiden | 426/611 |
| 5,460,847 | 10/1995 | Kawabata | 426/631 |
| 5,474,795 | 12/1995 | Surber | 426/611 |
| 5,514,405 | 5/1996 | Yokomichi | 426/438 |
| 5,518,754 | 5/1996 | Miller | 426/611 |
| 5,989,619 | 11/1999 | Zumbe | 426/631 |

FOREIGN PATENT DOCUMENTS

| | | | |
|---|---|---|---|
| 0282609 | 3/1987 | European Pat. Off. | 426/631 |
| 0442324 | 1/1991 | European Pat. Off. | 426/631 |
| 60-130341 | 7/1985 | Japan | 426/631 |
| 60-27339 | 2/1987 | Japan | 426/631 |
| 63-94940 | 4/1988 | Japan . | |
| 5-64545 | 3/1993 | Japan | 426/631 |
| 6-189682 | 7/1994 | Japan . | |
| 6-237694 | 8/1994 | Japan . | |
| WO93/12664 | 7/1993 | WIPO | 426/631 |

*Primary Examiner*—Carolyn Paden
*Attorney, Agent, or Firm*—Shinjyu Intellectual Property Firm

[57] ABSTRACT

The present invention is a method for manufacturing a water-in-oil type water-containing chocolates by mixing chocolate foodstuff with aqueous components, wherein sucrose-fatty acid ester, whose HLB value is 3 or less and the number of carbon atoms in its main constituent fatty acid is 16–18, and polyglycerin polyricinoleate is each used in the range of 0.05 wt. % to 5.0 wt. % with respect to the chocolate foodstuff.

5 Claims, No Drawings

METHOD FOR MANUFACTURING WATER-CONTAINING CHOCOLATES AND CHOCOLATE COMPOSITIONS PRODUCED THEREBY

This is a continuation in part of International Application PCT/JP99/00804, with an international filing date of Feb. 22, 1999.

BACKGROUND OF THE INVENTION

1. Technical Field

The present invention relates to methods for manufacturing water-containing chocolates, as well as to water-containing chocolate compositions. In particular, the present invention relates to a method for manufacturing water-containing chocolate, and to chocolate compositions that even with moisture added is not gritty from clumping of its solid content, nor is elevated in viscosity, and that has satisfactory workability and is moreover good tasting. Although there are water-in-oil type and oil-in-water type emulsion systems for water-containing chocolates, the present invention relates to methods for manufacturing water-in-oil type water-containing chocolates.

2. Description of Related Art

Various water-containing chocolates exist, from those whose moisture content is slight to those containing a large amount of moisture. For instance, the emulsion system of ganache, which is manufactured by mixing ordinary chocolate with different creams, is generally an oil-in-water type and hence, when used as a coating material, has the drawbacks of drying slowly and sticking to paper wrapping or of its moisture dehydrating. Further, a method that with a lipophilic emulsifier makes high moisture-containing components into a water-in-oil type emulsion added to chocolate, as a substance that can be mold-formed like ordinary chocolate, has been advocated (Japanese Laid-Open Gazette Pat. Appl. No. 60-27339). Nevertheless, making the moisture-containing components into the water-in-oil type emulsion is complicated by the need for exclusive processing facilities, and increases the work another step.

Still further, methods for adding aqueous components directly to chocolate have been advocated (Japanese Laid-Open Gazette Pat. Appl. Nos. 56-28131 and 3-164137). Such methods, however, limit the aqueous components to liquid sugar or enriched fresh cream. Moreover, methods for adding aqueous components, not particularly limited, directly to chocolate by using specific emulsifiers have been advocated (Japanese Laid-Open Gazette Pat. Appl. Nos. 3-151831, 6-062743, 6-189682, 6-237694, 8-070776, 9-140332, and 9-248132.) Water-containing chocolate in accordance with these suggestions is to an extent satisfying; nonetheless research toward improving quality further is ongoing.

SUMMARY OF THE INVENTION

The present invention provides a method in which water-containing components can be added as is to a chocolate foodstuff without any processing for readily manufacturing good tasting water-in-oil-type water-containing chocolates whose material properties are like ordinary chocolate and whose emulsive stability is good. The present invention accordingly also provides water-containing chocolates thus manufactured.

As a result of concerted investigation, the present inventors gained knowledge that the above-noted issues may be addressed by employing sucrose-fatty acid esters whose HLB (hydrophile-lipophile balance) value is 3 or less and in which the number of carbon atoms in the chief constituent fatty acids is 16–18, and polyglycerin polyricinoleate, and attained completion of the present invention.

Namely, the present invention is a method for manufacturing water-containing chocolates characterized in that when mixing a chocolate foodstuff and aqueous components to manufacture water-in-oil type water-containing chocolates, sucrose-fatty acid esters whose HLB value is 3 or less and in which the number of carbon atoms in the chief constituent fatty acids is 16–18, and polyglycerin polyricinoleate are each employed within a range of 0.05 wt. %–5.0 wt. % with respect to the chocolate foodstuff.

The present invention further is a water-in-oil emulsion of aqueous components dispersed in a chocolate food containing as emulsifiers sucrose-fatty acid esters of 16–18 chief constituent fatty acid carbon number, having an HLB value that is 3 or less, and polyglycerin polyricinoleate, each present in a 0.05 wt. %–5.0 wt. % with respect to the chocolate food.

In the present invention, anything that is used for ordinary chocolate except for emulsifiers may be employed as components of the chocolate foodstuff. That is, chocolate foodstuff the main components of which being sweet chocolate or milk chocolate, cocoa mass and/or cocoa, and sweetener such as sugar, powdered milk, oils/fats, and which is subjected to roll-mill and conche-treatments following standard methods, may be utilized. The oil part in the chocolate foodstuff is preferably 35 wt. %–70 wt. %. If the oil part exceeds the upper limit and a great amount is included, the flavor and texture of the water-containing chocolates that are the final product become disagreeably oily. Moreover, if the oil part does not meet the lower limit, the emulsification tends to become an oil-in-water type, making it undesirably difficult to form the water-in-oil type as intended.

As emulsifiers, sucrose-fatty acid esters whose HLB value is 3 or less and in which the number of carbon atoms in the chief constituent fatty acids is 16–18, and polyglycerin polyricinoleate are each employed within a range of 0.05 wt. %–5.0 wt. % with respect to the chocolate foodstuff. If the quantity of these emulsifiers used is less than the lower limit, it becomes difficult to achieve water-in-oil type emulsification and the emulsifying destabilizes. Furthermore, using these emulsifiers in excess of the upper limit does not gain commensurate effects, and on the contrary is undesirable since the taste of the emulsifiers themselves emerges. It is preferable that the emulsifiers are admixed into the chocolate foodstuff in advance.

For the present invention, besides the above-described emulsifiers, one or two of more species of, for example, lecithins, glycerin-fatty acid esters, polyglycerin-fatty acid esters, propyleneglycol-fatty acid esters and sorbitan fatty acid esters may be used in combination.

As aqueous components—besides natural creams, milk, fruit juices, jams, varieties of fruits, and candies—water-containing food items such as creams in which the numerous heretofore developed animal/vegetable oils/fats are used, condensed milk, cheese, nuts, natural honeys, coffee and tea are illustrative examples; and one, two or more kinds of these can be used. It is preferable that these water-containing food items are blended so as to make the moisture content 2.0 wt. %–50 wt. % with respect to the amount of water-containing chocolate as a whole. This is because it is difficult to obtain the characteristic flavors and texture of water-containing chocolate if the moisture content is less than the lower limit, and if the moisture content exceeds the upper limit, the oil-in-water type tends to form. Also, wherein mold separating in mold-forming is necessary, the moisture content is suitably 2.0 wt. %–10 wt. %.

As general methods for manufacturing water-containing chocolates in the present invention, a method as below is illustrative. Namely, sucrose-fatty acid esters whose HLB value is 3 or less and in which the number of carbon atoms in the chief constituent fatty acids is 16–18, and polyglycerin polyricinoleate are in advance each added to, and within a range of 0.05 wt. %–5.0 wt. % with respect to, a chocolate foodstuff. Then, a roll-mill and conching processed chocolate foodstuff is prepared following standard methods. The chocolate foodstuff is warmed to melting, and the aqueous components are added/blended in so as to disperse them uniformly.

The water-containing chocolates in the present invention, despite containing moisture, exhibit properties similar to ordinary chocolate and can be form-worked by molding or the like. Substituting the oils/fats used in the present invention makes it possible to obtain water-containing chocolates that can be icings on cakes and coatings on ice-cream bars, or made into chips that are dispersed into frozen confections, or that can be used as center materials. Furthermore, compounding the aqueous components brings to life in the chocolate flavors that the aqueous components possess, and new chocolate flavors that have not existed until now may be had. Further, containing moisture makes the texture very soft, which is one of the features of the present invention.

In accordance with the present invention, water-in-oil type water containing chocolates can be readily manufactured that, despite being mixed with water, can be form-worked by molding, coating, etc., likewise as with ordinary chocolate.

The foregoing and other objects, features, aspects and advantages of the present invention will become more apparent from the following detailed description in conjunction with the accompanying drawings.

DETAILED DESCRIPTION OF THE PREFERRED EMBODIMENTS

Embodiments

The present invention will now be explained more specifically according to the following embodiments and comparative examples; the scope of the present invention is not, however, limited to these examples. Also, "%" and "parts" expressed in the examples are weight-based indications.

Embodiment 1

A chocolate foodstuff of 50% oil portion was prepared by roll-milling and conching according to ordinary methods: 40 parts cocoa butter, 9 parts cocoa mass, 18 parts powdered whole milk, 33 parts sugar; 1.0 parts sucrose-stearic acid ester of HLB 1; 0.2 parts polyglycerin polyricinoleate; and 0.5 parts lecithin in combination. Seventy-five parts of the chocolate foodstuff was warming-melted to 35–40° C., to which 25 parts of a strawberry puree was added. Blending this so as to be uniform, a water-in-oil type water-containing chocolate of 23% moisture content was manufactured.

This water-containing chocolate had fluidity in a warmed state and was without grittiness. After tempering and cool-hardening the water-containing chocolate a cutting process was carried out. The cutting process could be carried out smoothly without any differences from ordinary chocolate. The chocolate and strawberry flavors accorded well in this water-containing chocolate; it was delicious, had a very soft texture and pleasantly melted in the mouth.

COMPARATIVE EXAMPLE 1

Without using the sucrose-stearic acid ester of HLB 1, a water-containing chocolate was prepared from a combination and by a procedure otherwise entirely like Example 1. When strawberry puree was added and blended uniformly into the water-containing chocolate, it became an oil-in-water type ganache.

Embodiment 2

A chocolate foodstuff of 50% oil portion was prepared by ordinary methods from: 40 parts cocoa oil, 9 parts cocoa mass, 18 parts powdered whole milk, 33 parts sugar; 1.0 parts sucrose-stearic acid ester of HLB 1; 0.2 parts polyglycerin polyricinoleate; and 0.5 parts lecithin in combination. Eighty-five [parts] of the chocolate foodstuff was warming-melted to 35–40° C., to which 12 parts fresh cream and 3 parts brandy were added. Blending this so as to be uniform, a water-in-oil type water-containing chocolate of 8% moisture content was manufactured. This water-containing chocolate had fluidity in a warmed state and was without grittiness.

Three parts of a seeding material, the main component of which being 2-oleyl 1,3 triglycerol behenide, was added to 100 parts of the water-containing chocolate, which was tempered and mold-hardened in a mold. A form-hardening operation was possible smoothly without any differences from ordinary chocolate. The water-containing chocolate was delicious, effecting the flavor of the liquor, very pleasantly melted in the mouth, and had a soft texture even in a frozen stage.

Furthermore, this water-containing chocolate could be safely circulated as a chocolate for frozen consumption, because even if the chocolate itself melts somewhat by exposure to heat due to the elevated temperatures of summertime, the seeding automatically restores the tempering effects.

COMPARATIVE EXAMPLE 2

Without using polyglycerine polyricinoleate, a water-containing chocolate was prepared from a combination and by a procedure otherwise entirely like Example 2. Immediately after uniformly stirring the aqueous components, the water-containing chocolate had fluidity and no grittiness. Nevertheless, while being worked, its texture became coarse, losing fluidity, and it exhibited a plasticizing phenomenon. Further, when stirring was continued, it became an oil-in-water type ganache.

EXAMPLE 3

A chocolate foodstuff of 49% oil portion was prepared by ordinary methods from: 35 parts fat/oil (a blended oil of 15 parts cocoa butter and 20 parts coconut oil); 20 parts cocoa mass; 10 parts powdered whole milk; 35 parts sugar; 1.0 parts sucrose-palmitic acid ester of HLB 1; 0.2 parts polyglycerin polyricinoleate; and 0.5 parts lecithin in combination. Seventy five parts of the chocolate foodstuff was warming-melted to 35–40° C., to which 25 parts of a banana puree was added. Blending this so as to be uniform, a water-in-oil type water-containing chocolate of 23% moisture content was manufactured. This water-containing chocolate had fluidity and was without grittiness.

In coating this water-containing chocolate onto ice cream, it dried quickly and worked smoothly without any differences from ordinary chocolate. The chocolate and banana flavors harmonized well in this coated chocolate; it was delicious and because of its soft texture, it exhibited a mouth-melt that felt integrated with the ice cream.

COMPARATIVE EXAMPLE 3

Without using sucrose-palmitic acid ester having HLB of 1, a water-containing chocolate was prepared from a combination and by a procedure otherwise entirely like Example 3. When banana puree was added and blended uniformly into the chocolate, it became an oil-in-water type ganache.

EXAMPLE 4

A chocolate foodstuff of 49% oil portion was prepared by ordinary methods from: 30 parts fat/oil (a blended oil of 10 parts cocoa butter and 20 parts hardened coconut oil); 35 parts cocoa mass; 35 parts sugar; 1.0 parts sucrose-stearic acid ester of HLB value of 1; 0.2 parts polyglycerin polyricinoleate; and 0.5 parts lecithin in combination. Seventy-five parts of the chocolate foodstuff was heated to 35–40° C. and 25 parts evaporated milk was added. Blending this so as to be uniform, a water-in-oil type water-containing chocolate of 18% moisture content was manufactured. This chocolate had fluidity and was without grittiness.

In coating this chocolate onto a butter cake, it dried quickly and worked smoothly without any differences from ordinary chocolate. The chocolate and milk flavors harmonized well in this coated chocolate; it was delicious and because of its soft texture, it exhibited a mouth-melt that felt integrated with the cake.

COMPARATIVE EXAMPLE 4

Without using sucrose-stearic acid ester of HLB 1, a water-containing chocolate was prepared from a combination and by a procedure otherwise entirely like Example 4. When evaporated milk was added and blended uniformly into the chocolate, it became an oil-in-water type ganache.

EXAMPLES 5–7; COMPARATIVE EXAMPLES 5–8

A chocolate foodstuff of 50% oil content was prepared by roll-milling and conching according to ordinary methods, in combination: 40 parts cocoa butter; 9 parts cocoa mass; 18 parts powdered whole milk; 33 parts sugar; and emulsifiers from Table 1 below. Seventy-five parts of the chocolate foodstuff was warming-melted to 35–40° C., to which 25 parts of a strawberry puree was added. Blending them so as to be uniform, water-in-oil type water-containing chocolates of 23% moisture content were manufactured.

TABLE 1

| | SE | | Amount | |
|---|---|---|---|---|
| | HLB | Amt. Added (%) | PGPR Added | Results |
| Embodiment 5 | 1 | 5 | 0.05 | Satisfactory |
| Embodiment 6 | 1 | 0.05 | 3 | Satisfactory |
| Embodiment 7 | 3 | 1 | 0.2 | Satisfactory |
| Compar. Ex. 5 | 5 | 1 | 0.2 | Poor |
| Compar. Ex. 6 | 1 | 6 | 0.05 | Poor |
| Compar. EX. 7 | 1 | 0.05 | 6 | Poor |
| Compar. Ex. 8 | 1 | 0.03 | 2 | Poor |

SE in Table 1 indicates sucrose-fatty acid esters, and PGPR, polyglycerine ricinoleate. Also, the SE added amount is wt. % with respect to the chocolate foodstuff.

The water-containing chocolates of Embodiments 5–7, as the results "satisfactory" indicate in Table 1, had fluidity in a warmed state and were without grittiness. After tempering and cool-hardening the water-containing chocolate a cutting process was carried out. The cutting process could be carried out smoothly without any differences from ordinary chocolate. The chocolate and strawberry flavors matched well in this water-containing chocolate; it was delicious, had a very soft texture and pleasantly melted in the mouth.

On the other hand, in Comparative Example 5 in which sucrose-fatty acid ester of HLB 5 was utilized, the result was unsuitable, being difficult to make the emulsification water-in-oil type. Further, in Comparative Example 6, in which the amount added sucrose acid-esters was made to be 6%, and in Comparative Example 7, in which the amount added polyglycerine ricinoleate was made to be 6%, the taste of the respective emulsifiers was undesirably strong. Further still, in Comparative Example 8 in which the amount added sucrose-fatty acid esters were each made 0.03 [%], though the emulsification was a water-in-oil type, the degree of emulsifying was in sufficient.

Various details of the present invention may be changed without departing from its spirit nor its scope. Furthermore, the foregoing description of the embodiments according to the present invention are provided for illustration only, and not for the purpose of limiting the invention as defined by the appended claims and their equivalents.

What is claimed is:

1. A method for manufacturing water-in-oil type water containing chocolates comprising mixing a chocolate foodstuff, an aqueous component and within the range of 0.05 wt %–5.0 wt % with respect to said chocolate foodstuff each of:

sucrose-fatty acid esters having an BLB value that is 3 or less and wherein the number of carbon atoms in the chief constituent fatty acids is 16–18, and polyglycerin polyricinoleate.

2. The manufacturing method set forth in claim 1, wherein aqueous components are mixed in with the chocolate foodstuff such that moisture content with respect to total amount of said water-containing chocolate becomes 2 wt. %–50 wt. %.

3. The manufacturing method set forth in claim 1 or 2, wherein oil part of said chocolate foodstuff is 35 wt. %–70 wt. %.

4. The manufacturing method set forth in any of claims 1–3, wherein said chocolate foodstuff is a dark chocolate base including cocoa mass or cocoa ingredients.

5. A water-in-oil emulsion of aqueous components dispersed in a chocolate food containing as emulsifiers:

0.05 to 5.00 wt. % sucrose-fatty acid esters of 16–18 chief constituent fatty acid carbon number, having an HLB value that is 3 or less; and 0.05 to 5.00 wt. % polyglycerin polyricinoleate.

* * * * *